United States Patent

[11] 3,623,583

[72] Inventor William J. Shimanckas
Waukegan, Ill.
[21] Appl. No. 809,465
[22] Filed Mar. 10, 1969
[45] Patented Nov. 30, 1971
[73] Assignee Outboard Marine Corporation
Waukegan, Ill.
Continuation of application Ser. No.
627,106, Mar. 30, 1967, now abandoned.
This application Mar. 10, 1969, Ser. No.
809,465

[54] ELECTRICALLY OPERATED CONTROL
MECHANISM FOR A HYDRAULIC SHIFTING
MECHANISM
27 Claims, 7 Drawing Figs.

[52] U.S. Cl. ................................................. 192/51,
91/402, 91/459, 192/67 DO, 192/87.15,
192/87.19, 317/155.5, 335/268
[51] Int. Cl. ................................................. F16d 25/061
[50] Field of Search .......................... 192/91 A,
51, 87.15, 87.19, 85, 67, 85 A; 91/459, 402;
174/378; 317/155.5; 335/268

[56] References Cited
UNITED STATES PATENTS
2,276,862 3/1942 Peterson et al. ............... 192/67
2,529,423 11/1950 Schou ............................ 192/91

| 2,533,187 | 12/1950 | Cataldo et al. | 335/268 X |
| 2,582,088 | 1/1952 | Walthers | 91/459 X |
| 2,592,695 | 4/1952 | Hindmarch | 192/87.15 X |
| 2,675,835 | 4/1954 | Kiekhaefer | 192/67 X |
| 2,842,334 | 7/1958 | Short | 335/268 X |
| 2,887,201 | 5/1959 | Willis | 192/67 |
| 2,977,762 | 4/1961 | Dilworth | 91/459 X |
| 3,017,546 | 1/1962 | Bates | 335/268 X |
| 3,224,535 | 12/1965 | Herbkersman | 192/67 |
| 3,228,502 | 1/1966 | Gadd | 192/87.19 |
| 3,441,117 | 4/1969 | McNamara | 192/87.19 |
| 2,718,792 | 9/1955 | Kiekhaefer | 74/378 |

Primary Examiner—Martin P. Schwadron
Assistant Examiner—Leslie J. Payne
Attorneys—Robert K. Gerling, Robert E. Clemency, John W. Michael, Gerrit D. Foster, Bayard H. Michael, Paul R. Puerner, Joseph A. Gemignani and Andrew O. Riteris ABSTRACT: Disclosed herein is a marine propulsion unit or device including a hydraulic mechanism which is operative to effect shifting of a clutch from a fail-safe forward drive condition to either of a neutral or reverse condition. Also disclosed herein is an electrically operated control mechanism for the hydraulic mechanism, which control mechanism is also designed to fail safe in forward drive.
The control mechanism includes aligned, neutral and rearward drive solenoids which are selectively energizeable to afford neutral and reverse drive and which are operably associated with a single plunger carrying a spool valve embodied in the hydraulic system.

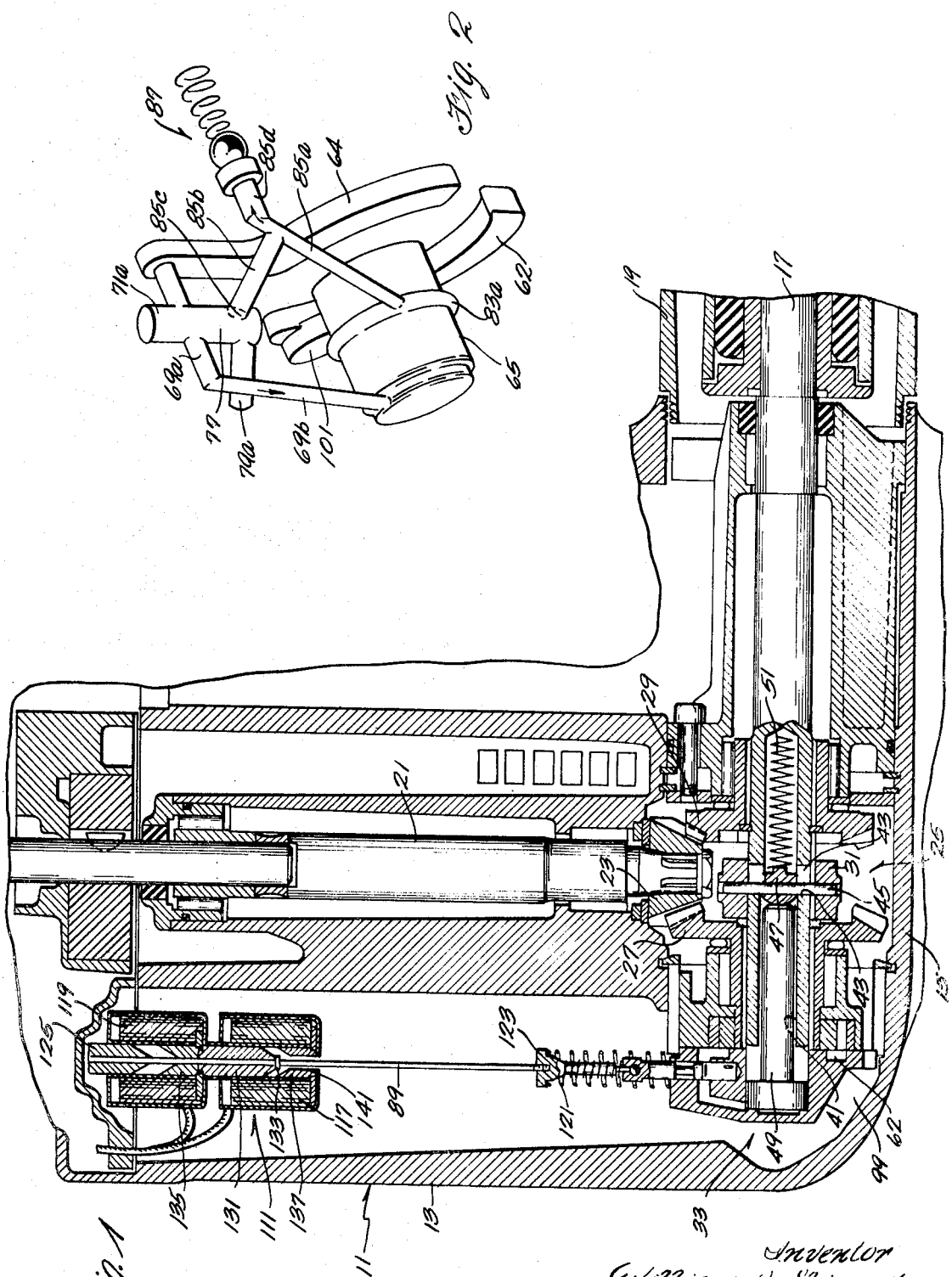

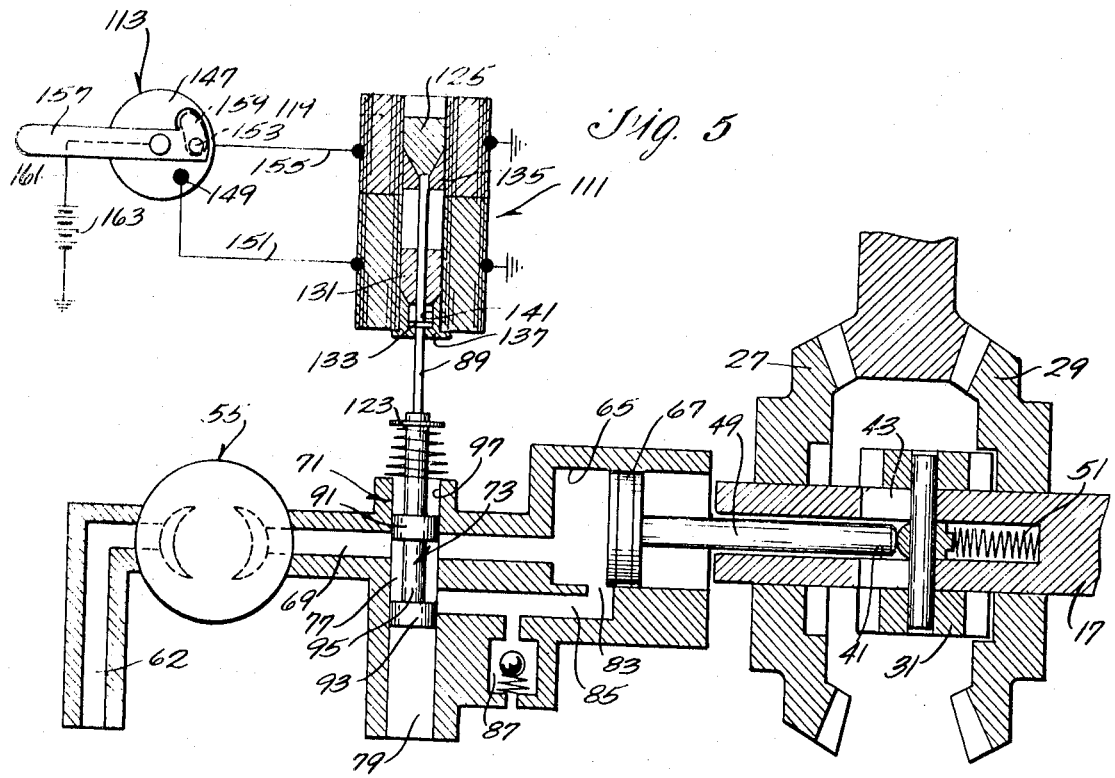
Fig. 5
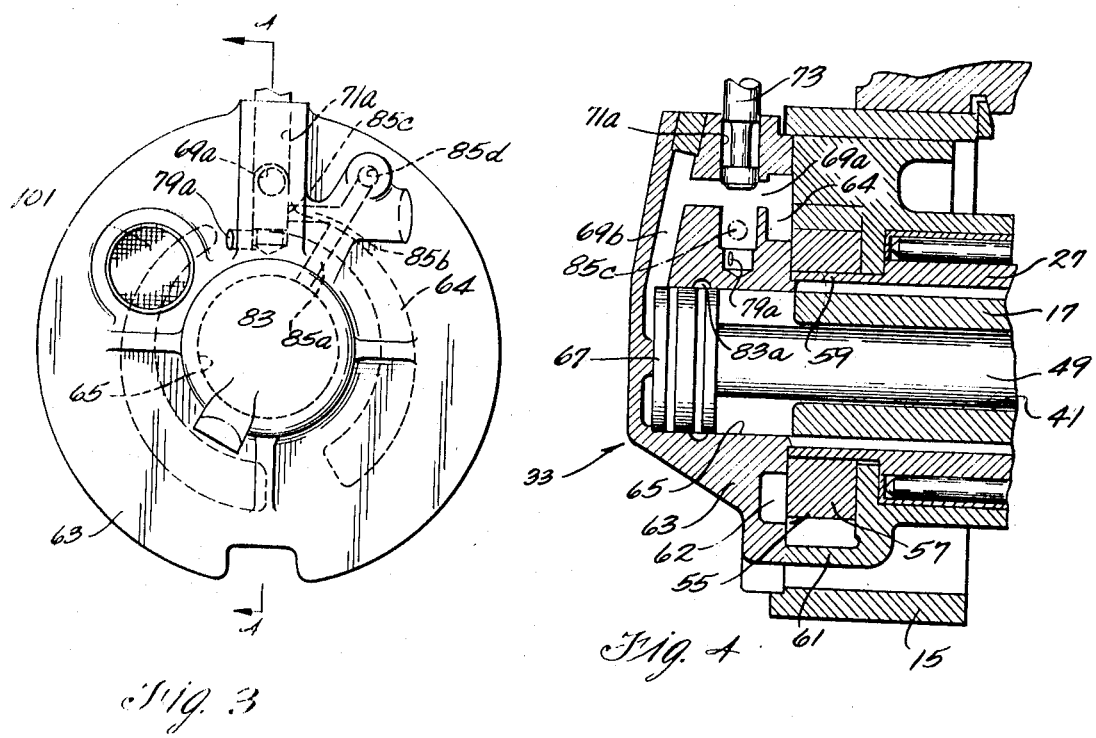
Fig. 3
Fig. 4

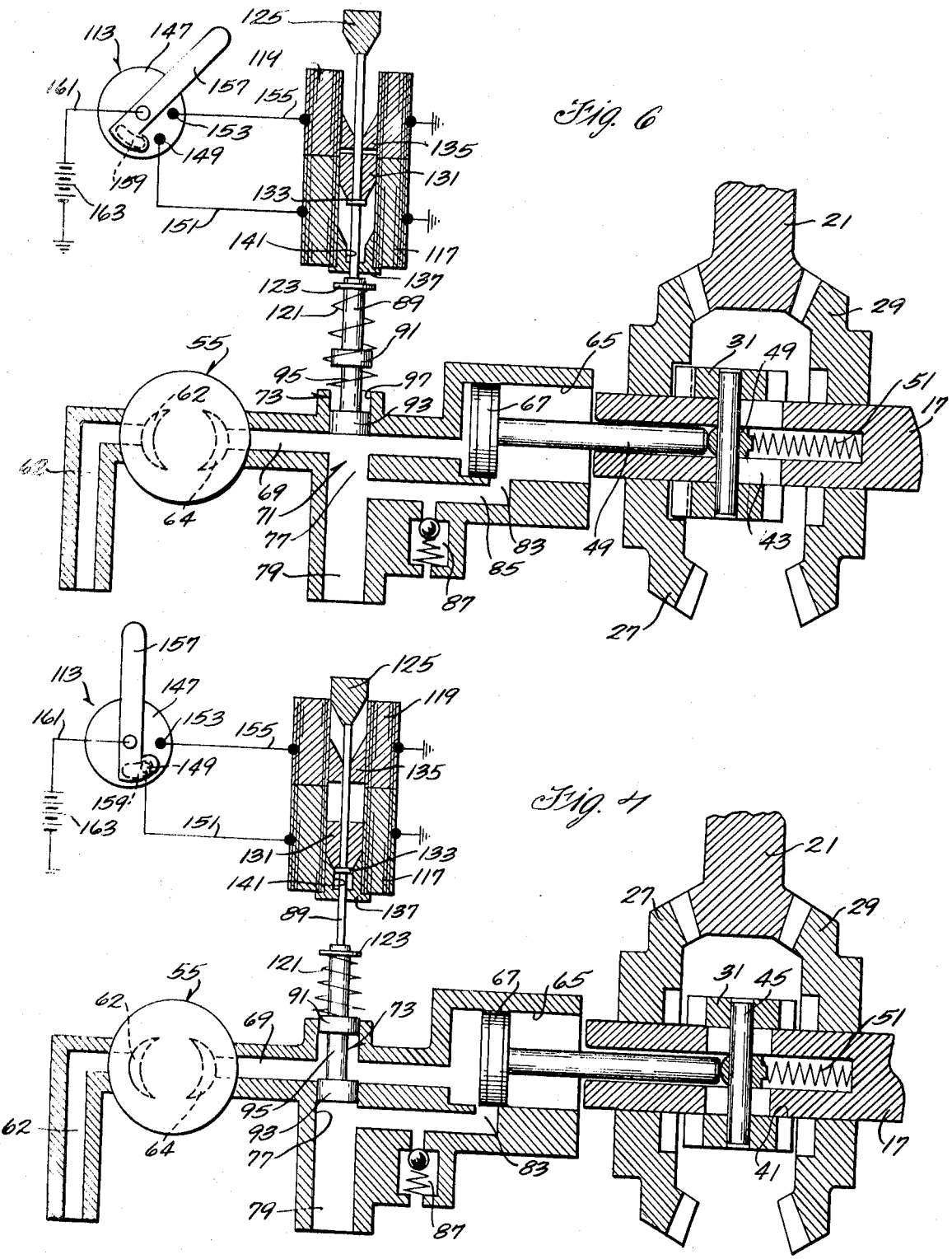

ELECTRICALLY OPERATED CONTROL MECHANISM FOR A HYDRAULIC SHIFTING MECHANISM

RELATED APPLICATION

This application is a continuation of application, Ser. No. 627,106, filed Mar. 30, 1967 now abandoned.

BACKGROUND OF INVENTION

In the past, shifting mechanisms of marine propulsion devices were either electrically or mechanically operated. In the event of some failure of the operating mechanism, it was often impossible to maintain the shifting mechanism in a drive condition and the propulsion unit was at least temporarily inoperative to propel a boat.

SUMMARY OF INVENTION

In accordance with the invention, there is provided a clutch or shifting mechanism which is yieldably biased into drive condition so that in the event of failure of the operating control, a drive engagement will automatically be available. Consequently, the operator of the boat will be able to continue use of the propulsion unit to propel the boat along the water. Preferably, the drive engagement is a forward drove engagement.

Also in accordance with the invention there is provided a hydraulic mechanism which is operable to effect shifting of the clutch from a fail-safe drive position (preferably forward drive) to either or both of a neutral position and rearward drive position against the action of a biasing means incorporated in the shifting mechanism. The hydraulic mechanism also includes a control valve which is biased toward a fail-safe position affording drive (preferably forward drive) so that should there be a loss of hydraulic fluid or some other failure rendering the hydraulic mechanism inoperative, a drive engagement will be afforded.

Also in accordance with the invention, there is provided an electrical arrangement for controlling the hydraulic mechanism. The electrical control mechanism employs two solenoids which are respectively associated with neutral and rearward drive conditions, which are normally deenergized during forward drive condition, and which are electrically operated by a single lever control device. Also included in the electrical control mechanism is a plunger which is connected to the control valve of the hydraulic mechanism, which passes through the solenoids, which includes an armature part, and which has movably mounted thereon a floating armature. The arrangement for biasing the control valve for the hydraulic mechanism also serves as a means for biasing the plunger toward the drive position. Consequently, under normal forward drive conditions, there is no usage of electrical energy. In addition, in the event of malfunctioning of the electrical system either for lack of electrical current or otherwise, the plunger is automatically located in forward drive position, thereby permitting continued operation of the marine propulsion device to propel the boat over the water. Other objects and advantages of the invention will become apparent from the following description and accompanying drawings in which:

DRAWINGS

FIG. 1 is a fragmentary view, partially in section, of a marine propulsion lower unit embodying various of the features of the invention;

FIG. 2 is a schematic illustration of a duct system embodied in a hydraulic mechanism incorporated in the lower unit shown in FIG. 1;

FIG. 3 is an enlarged end view of a portion of the mechanism shown in FIG. 1;

FIG. 4 is a sectional view taken along line 4—4 of FIG. 3;

FIG. 5 is a schematic view of the mechanism embodied in the lower unit shown in FIG. 1; the mechanisms being shown in their reverse drive positions;

FIG. 6 is a schematic view similar to FIG. 5 showing the mechanisms in their forward drive position; and FIG. 7 is a view similar to FIGS. 5 and 6 shown in the mechanisms in their neutral drive position.

GENERAL DESCRIPTION

Shown in FIG. 1 of the drawings is a marine propulsion lower unit 11 including a drive shaft housing 13 having, at its lower end, a gear case 15. Rotatably carried in the gear case by any conventional means is a propeller shaft 17 which, at its rearward end, carries a propeller 19. As is also conventional, extending through the drive shaft housing 13 is a drive shaft 21 which is suitably journaled for rotation and which includes, at its lower end, a bevel gear 23 which constitutes one portion of a shifting mechanism or clutch 25 affording shifting between rearward drive, forward drive and neutral conditions. Meshed with the bevel gear 23 are a pair of opposing bevel gears 27 and 29 which are rotatably carried on the propeller shaft 17. In order to affect forward, rearward, and neutral drive conditions, the clutch 25 also includes a dog 31 which is axially slidably mounted on the propeller shaft 17 for common rotary movement therewith, as for instance, by means of a splined connection, and for selective positioning between a forward drive or thrust position in engagement with the forward bevel gear 27, a rearward drive or thrust position in engagement with the rearward bevel gear 29, and an intermediate or neutral position free of engagement with either of the bevel gears 27 and 29.

In accordance with the invention, the dog 31 is biased into the forward drive condition, and there is provided a hydraulically operated means or mechanism 33 for shifting the dog 31 from forward drive position to either neutral or reverse drive. The hydraulic mechanism can be either electrically controlled or mechanically actuated.

More specifically, various arrangements can be provided for biasing the dog 31 into forward drive position and for hydraulically displacing the dog 31 from its forward drive position. In this regard, in the disclosed construction, the forward portion of the propeller shaft 17 includes an axial bore 41 which communicates, at a point spaced rearwardly of the forward end of the propeller shaft 17, with a pair of diametrically opposed, axially extending slots 43.

Extending through the slots 43 and through the bore 41 is a pin 45 which, at its outer ends, is received in the dog 31. Within the bore 41, the pin 45 passes through a member 47 which, at its forward end, is spherically shaped for engagement with an actuator or push rod 49 operated by the hydraulic mechanism 33. Confined under pressure within the rearward part of the bore 41 between the member 47 and the blind end of the bore is a spring 51 which yieldably biases the pin 45, and therefore the dog 31, against the push rod 49. In the event of failure of the hydraulic mechanism or its control, the spring 51 advantageously serves to bias the dog 31 into the forward drive position, thereby providing a fail-safe condition.

From the foregoing, it is believed to be apparent that rearward displacement by the push rod or actuator 49 of the member 47, against the action of the spring 51, will be effective to shift the clutch 25 into neutral and reverse.

The hydraulic mechanism 33 of the invention comprises, as shown best in FIG. 4 a pump 55 which, for example, can be of the gerotor type with an impeller 57 and which is carried on a hub 59 of the forward bevel gear 27 for rotation with the forward bevel gear 27. The pump 55 is contained in a housing or member 61 which is located in the gear case 15 and which is closed by a cover or cap or member 63. Other pumps and other arrangements for driving the pump can be employed.

It is believed that the construction and operation of the hydraulic mechanism 33 can be best understood by reference to FIGS. 5, 6, and 7 which schematically illustrate the construction and operation of the hydraulic mechanism 33 and the duct means or system or arrangement incorporated therein.

As shown in FIG. 6, the pump 55 communicates through an inlet 62 with a sump and with a duct means or system including an oil discharge passage 64 communicating with a duct 69. In turn, the duct 69 communicates with a cylinder 65 which is coaxial with the propeller shaft 17 and has a piston 67 with an extending rod which constitutes the actuator 49. Also in the duct system or arrangement is a conduit 71 which includes a first portion 77 communicating with the duct 69 and a second portion 79 communicating with the sump. Located in the cylinder 65 is a port 83 which is spaced from the head end of the cylinder at a distance approximately equal to the distance between the forward drive and neutral positions of the dog 31 and which communicates with a passageway 85 communicating with the first portion 77 of the duct 71.

Communicating with the duct system is a pressure relief valve 87 which, in the specifically disclosed construction, communicates with the passageway 85 and with the sump.

Located in the conduit 71 is a control member or valve means in the form of a spool valve 73 which is operable between different positions to afford selective hydraulic action of the piston 67 and push rod 49. The spool valve 73 is carried on an element in the form of a push rod or plunger 89 and comprises two spaced lands or shoulders 91 and 93 connected by an intervening body portion 95 or section. The spool valve is movable in the conduit 71 between serially spaced positions offering forward drive, neutral and rearward drive conditions.

In forward drive operation as shown in FIG. 6, the dog 31 is normally held in engaged position with the bevel gear 27 by the spring 51 and the spool valve 73 is positioned such that the oil discharged by the pump 55 is free to flow from the duct 69 through the conduit 71 into the sump (not shown).

In neutral operation, as shown in FIG. 7, the spool valve 73 is shifted sufficiently so that the bottom land or shoulder 93 blocks direct communication between the duct 69 and the first conduit portion 77 and so that the oil discharge from the pump 55 flows past the body section 93 of the spool valve 73 and into the head end of the cylinder 65, thereby displacing the piston 67 until the port 83 is open or uncovered and so that the dog 31 is moved to its neutral position. Such opening of the port 83 affords oil flow through the passageway 85 to the first conduit portion 77 and out through the second conduit portion 79 into the sump 81 in the housing 61. Thus, when the spool valve 73 is shifted to its neutral position, the piston 67 is displaced only sufficiently to open the port 83 and so as to displace the dog 31 to its neutral position.

However, when the spool valve 73 is shifted to its reverse position, as shown in FIG. 5, the land 93 is moved in the conduit 71 to a position blocking the first conduit portion 77 from the second conduit portion 79. Under such circumstances, oil flows from the pump 55 through the duct 69 to the head end of the cylinder 65 and through the duct 69 to the first conduit portion 77 and through the passageway 85 to the port 83 and into the cylinder 65, thereby further raising the pressure in the cylinder 65 so as to displace the piston 67 sufficiently to engage the dog 31 with the rearward bevel gear 29. Upon such occurrence the hydraulic pressure will continue to build up until the relief valve 87 opens to relieve excessive pressure and drain excessive oil to the sump. At all times, the land 91 of the spool valve 73 through the upper conduit portion 97.

The oil discharge passage 64 from the pump 55 communicates with a first bore which is identified by the numeral 69a in FIGS. 2, 3, and 4 and which, in turn, communicates with a second or crossbore 69b shown in FIGS. 2 and 4. The bores 69a and 69b provide previously mentioned duct 69. Intersecting the bore 69a is another bore which is identified by numeral 71a in FIGS. 2, 3, and 4 and which provides the conduit portions 77 and 97 previously identified. Extending from the bore 71a is a transverse bore 79a which communicates with the sump in the housing 61 and which provides the previously mentioned conduit portion 79. Extending between the bore 71a and the cylinder 65 are a pair of angularly related bores 85a and 85b, which are shown in FIGS. 2 and 3 and which provide the passageway 85 previously mentioned. Bore 85a communicates with a annular recess 83a which constitutes the previously mentioned port 83 and bore 85a communicates through a port 85c (See FIGS. 3 and 4) with bore 71a (conduit portion 77). Extending from the juncture of the bores 85a and 85 b is a bore 85d which terminates in the pressure relief valve 87.

In the specific construction which is embodied in the marine propulsion unit shown in FIG. 1, the oil pump 55 communicates with a sump 99 (See FIG. 1) through the inlet 62 (See FIGS. 2 and 4) which extends through the cap 63 and which is provided with a screened intake port 101 (See FIG. 3). In the disclosed construction, the sump 99 is constituted by the cavity which is formed by the inner walls of the gear case 15 and which normally contains oil for lubricating the clutch 25, propeller shaft 17 and other components in the gear case. Although other fluids can be employed, in the specifically disclosed construction, such lubricating oil serves as the hydraulic fluid.

As already noted, the hydraulic mechanism 33 can be actuated or controlled either by an electrical or mechanical means or mechanism. For instance, mechanical means could be employed to shift the push rod or plunger 89 to locate the spool valve 73 in its various positions. However, in the disclosed construction the hydraulic mechanism 33 is actuated by an electrically operated control means or mechanism 111 (See FIGS. 5–7) operated by a so called "single lever" control device 113 (See FIG. 6). However, other arrangements could be employed for operating the electrical control mechanism.

More specifically, the control mechanism 111 includes the plunger or push rod 89 which carries the spool valve 73 and which extends through a pair of axially adjacent solenoids hereinafter sometimes referred to as the neutral solenoid 117 and the reverse solenoid 119. The plunger 89 and the spool valve 73 are guided for movement between forward, rearward and neutral drive positions by engagement of the spool valve 73 in the conduit 71 and by cooperation of the push rod 89 with the solenoids 117 and 119.

The plunger 89 is yieldably biased by suitable means into a forward drive position. While various arrangements can be employed, the plunger 89 is biased by means in the form of a spring 121 which encircles the plunger 89 and/or spool valve 73 and is confined between a shoulder 123 on the plunger 89 and the cap 63. Said arrangement also constitutes a means for yieldably biasing the control member or spool valve 73 of the hydraulic mechanism to its forward drive position. Provided on the top plunger is an armature part which will be referred to hereinafter and which is located, when the plunger is in forward drive position, in a remote position at least partially withdrawn from the reverse solenoid 119.

Carried on the plunger 89 for relative movement axially of the neutral solenoid 117 is a floating armature 131 (See FIGS. 1 and 6). More specifically, when the plunger 89 is in its forward position (Shown in FIG. 6), the floating armature 131 is located in withdrawn position relative to the neutral solenoid 117 between a stop in the form of a C-ring or collar 133 on the plunger 89 and one end of a stop or member 135 which, in the disclosed construction, is located in the adjacent end of the bore of the reverse solenoid 119. The stop member 135 cooperates with the spring 121 to determine the forward drive position by limiting plunger movement under the bias of the spring 121.

Upon energizing of the neutral solenoid 117, the floating armature 131 (As shown in FIG. 7) is attracted toward the neutral armature 117. As a consequence, the floating armature 131 engages the collar 133 and displaces the plunger 89 against the action of the spring 121 until the floating armature 131 is fully inserted or drawn into the neutral solenoid 117 and engages a second stop or member 137 located in the bore of the neutral solenoid 117. Such movement of the plunger 89 is effective to locate the spool valve 73 in its neutral position and to partially draw the armature part 125 into the reverse solenoid 119.

The stop member 137 in the neutral solenoid 117 includes a counterbore 141 which, as will be seen, permits additional movement of the collar 133 and plunger 89 against the action of the spring 121 even though further movement of the floating armature 131 is prevented by reason of engagement against the stop member 137.

Upon energizing of the reverse solenoid 119 when the neutral solenoid 117 is also energized, the armature part 125 (As shown in FIG. 7) is drawn fully into the reverse solenoid 119 against the action of the spring 121 until engagement of the armature part 125 with the other end of the stop member 135 located in the bore of the reverse solenoid 119. Such movement of the armature part 125 displaces the plunger 89 against the spring 121 to locate the spool valve 73 in its reverse position. Such push rod movement also serves to displace the collar 133 into the counterbore 141 without displacing the floating armature 131.

Upon deenergizing of the neutral solenoid 117, when the reverse solenoid 119 is not also energized, the spring 121 serves to return the push rod 89 to its forward drive position and to locate the components as shown in FIG. 6. Upon deenergizing of the reverse solenoid 119, the components will return either to the neutral position and then to the forward drive position or directly to the forward drive position depending upon the mode of operation, i.e. depending upon whether the neutral solenoid 117 is energized. In the disclosed construction, the components return to the neutral position and then, upon deenergizing of the neutral solenoid 117, to the forward drive position as a consequence of the use of the single lever control device 113.

More particularly, the single lever control device 113 can be fabricated in various ways well known in the art and comprises, as shown in FIG. 6, an insulating disc or member 147 having control means including a neutral drive contact 149 which is electrically connected through a lead 151 to the neutral solenoid 117. Also mounted on the insulating disc 147 is a reverse drive contact 153 which forms a part of the control means and which is electrically connected through a lead 155 to the reverse solenoid 119. Carried for movement relative to the contacts 149 and 153 is a control lever 157 which includes a contact 159 electrically connected by a lead 161 to a source of electrical power, as for example a battery 163.

The control lever 157 is movable between forward drive, neutral drive and reverse drive positions. In the forward drive position of the control lever 157, the contact 159 is clear of both of the neutral and reverse drive contacts 149 and 153 and the solenoids 117 and 119 are not energized. Under such circumstances, the spring 121 biases plunger 89 and the spool valve 73 into forward drive positions. In the neutral drive position of the control lever 157 (SEE FIG. 7), the contact 159 engages the neutral drive contact 149 to energize the neutral solenoid 117 and thereby locate the plunger 89 and the spool valve 73 in their neutral positions. In the reverse position of the control lever 157 (See FIG. 5), the contact 159 engages the reverse solenoid contact 153 to energize the reverse solenoid 119 and to thereby effect movement of the plunger 89 and the spool valve 73 to their reverse drive positions.

Means are provided for at least temporarily simultaneously energizing the neutral and reverse solenoids 117 and 119 during movement of the control lever 157 between the neutral and reverse drive positions. Although various arrangements can be employed, in the disclosed construction, the contact 159 on the control lever 157 is sufficiently large so as to be capable of bridging the neutral and reverse drive contacts 149 and 153 so as to at least temporarily energize both solenoids 117 and 119 during movement from the neutral drive to the reverse drive positions. Such simultaneous energizing of the solenoids 117 and 119 serves to insure retention of the floating armature 131 in its inserted position (See FIGS. 7 and 5) and maintainence of the armature part 125 in position for attraction by the reverse solenoid 119 until such time as the reverse solenoid 119 is energized. If desired, the contact 159 on the control lever 157 can be sufficiently large so that electrical connection with the neutral drive contact 149 is maintained with the control lever 157 is in both the neutral and reverse drive positions.

While the stop members 135 and 137 have been disclosed as being located in the solenoid bores, it is to be understood that other stops or means for limiting movement or travel of the plunger 89 relative to the solenoids 117 and 119 and of the floating armature 151 relative to the plunger 89 and solenoids 117 and 119 can be used and that, if desired, such other stops can be located other than in the solenoid bores.

The disclosed construction provides an electrically actuated hydraulically operated clutch arrangement which is fail safe in operation. Specifically in case of non function of either the hydraulic mechanism 33 or the electrical control mechanism 111 the clutch mechanism 25 will automatically be located in a forward drive condition. It is also noted that forward drive condition is employed without energizing the electrical solenoids 117 and 119, whereby drive operation is obtained without running down a source of current, such as the battery 163, and even in the absence of any source of current.

It is also to be noted that the fail-safe clutch mechanism 25 can be designed to operate interchangeably with either the disclosed hydraulic mechanism 33 or with a mechanical linkage. In addition, the hydraulic mechanism 33, and especially the plunger 89 thereof, can e designed to operate interchangeably with either the electrical control 111 as disclosed herein or with a mechanical linkage.

Various of the features of the invention are set forth in the following claims.

I claim:

1. a marine propulsion unit comprising a lower unit including a propeller shaft, means rotatably mounting said propeller shaft, a dog mounted on said propeller shaft for movement axially thereof relative to a drive position, means in said lower unit yieldably biasing said dog to said drive position, hydraulic means for shifting said dog from said drive position against the action of said biasing means, a sump, an oil pump communicating with said sump and duct means communicating between said pump and said hydraulic means and said sump and including valve means affording direct communication with said sump when said dog is in said drive position and preventing direct communication with said sump and affording communication through said hydraulic means to said sump after said dog is shifted from said drive position by said hydraulic means.

2. A marine propulsion unit comprising a lower unit including a propeller shaft, means rotatably mounting said propeller shaft, a dog mounted on said propeller shaft for movement axially thereof relative to a drive position, means in said lower unit yieldably biasing said dog to said drive position, hydraulic means for shifting said dog from said drive position against the action of said biasing means, said hydraulic means including a cylinder, a piston having a rod operably connected to said dog, said piston being movable in said cylinder between first, second, and third positions, a sump, an oil pump communicating with said sump, and duct means communicating between said pump and said cylinder and said sump and including valve means movable between a first position affording direct communication between said pump and said sump independently of said cylinder, a second position affording communication between said pump and said sump in response to movement of said piston from said first position to said second position, and a third position affording communication between said pump and said sump in response to movement of said piston from said second position to said third position.

3. A unit in accordance with claim 2 including a pressure relief valve affording said communication between said pump and said sump when said valve means is in said third position.

4. A unit in accordance with claim 2 including means yieldably biasing said valve means to said first position.

5. A unit in accordance with claim 2 wherein said biasing means yieldably biases said piston to said first position.

6. A unit in accordance with claim 2 including electrically operated means for shifting said valve means between said first, second, and third positions.

7. A unit in accordance with claim 6 wherein said electrically operated means includes means for yieldably biasing said valve means to said first position in the event said electrically operated means is otherwise rendered inoperative.

8. A unit in accordance with claim 6 wherein said electrically operated means includes axially aligned neutral and reverse solenoids, an element connected to said valve means and having an armature part and extending through said solenoids for movement axially relative thereto between a first element position wherein said armature part is located in a first relation with respect to said reverse solenoid, a second element position wherein said armature part is located remotely from said reverse solenoid as compared to when said element is in said first element position, and a third element position wherein said armature part is located more remotely from said reverse solenoid than when said element is in said second element position, a floating armature movable on said element axially of said solenoids between a first armature position with respect to said neutral solenoid and a second armature position more remote from said neutral solenoid as compared to said first armature position, stops on said element and floating armature for limiting relative movement therebetween and biasing means for yieldably locating said element in its said first element position with said floating armature located in its said second armature position, whereby when said neutral solenoid is energized said floating armature is moved to its said first armature position and said element is displaced to its said second element position and whereby when said reverse solenoid is energized said armature part moves to its said first relation to said reverse solenoid, thereby displacing said element to its said third element position.

9. A unit in accordance with claim 8 including a device electrically connected to said solenoids and including cooperating relatively movable electrical contact means movable serially between a first contact position wherein said solenoids are deenergized, a second contact position wherein said neutral solenoid is energized to displace said floating armature from said second armature position to said first armature position with respect to said neutral solenoid thereby displacing said element from said first element position to said second element position, and a third contact position wherein said reverse solenoid is energized to displace said armature part to said first relation with respect to said reverse solenoid thereby displacing said element from said second element position to said third element position.

10. In a marine propulsion unit the combination of a cylinder, a piston movable in said cylinder between first, second, and third piston positions, a sump, an oil pump communicating with said sump, and duct means communicating between said pump and said cylinder and said sump and including valve means movable between a first position affording direct communication between said pump and said sump through said cylinder, a second position affording communication between said pump and said sump through said cylinder in response to movement of said piston from said first piston position to said second piston position, and a third position affording communication between said pump and said sump in response to movement of said piston from said second piston position to said third piston position.

11. A unit in accordance with claim 10 including a pressure relief valve affording said communication between said pump and said sump when said valve means is in said third position.

12. A unit in accordance with claim 10 including means yieldably biasing said valve means to said first position.

13. A unit in accordance with claim 10 including means yieldably biasing said piston toward said first piston position.

14. A unit in accordance with claim 10 including electrically operated means for shifting said valve means between said first, second, and third positions.

15. A unit in accordance with claim 14 wherein said electrically operated means includes means for yieldably biasing said valve means to said first position in the event said electrically operated means is otherwise rendered inoperative.

16. A unit in accordance with claim 14 wherein said electrically operated means includes axially aligned neutral and reverse solenoids, an element connected to said valve means and having an armature part and extending through said solenoids for movement axially relative thereto between a first element position wherein said armature part is located in a first relation with respect to said reverse solenoid, a second element position wherein said armature part is located remotely from said reverse solenoid as compared to when said element is in said first element position, and third element position wherein said armature part is located more remotely from said reverse solenoid than when said element is in said second element position, a floating armature movable on said element axially of said solenoids between a first armature position with respect to said neutral solenoid and a second armature position more remote from said neutral solenoid as compared to said first armature position, stops on said element and floating armature for limiting relative movement therebetween, and biasing means for yieldably locating said element in its said first element position with said floating armature located in its said second armature position, whereby when said neutral solenoid is energized said floating armature is moved to its said first armature position and said element is displaced to its said second element position and whereby when said reverse solenoid is energized said armature part moves to its said first relation to said reverse solenoid, thereby displacing said element to its said third element position.

17. A unit in accordance with claim 16 including a device electrically connected to said solenoids and including cooperating relatively movable electrical contact means movable serially between a first contact position wherein said solenoids are deenergized, a second contact position wherein said neutral solenoid is energized to displace said floating armature from said second armature position to said first armature position with respect to said neutral solenoid thereby displacing said element from said first element position to said second element position, and a third contact position wherein said reverse solenoid is energized to displace said armature part to said first relation with respect to said reverse solenoid thereby displacing said element from second element position to said third element position.

18. A device in accordance with claim 17 wherein said electrical contact means includes means for at least temporarily simultaneously energizing said neutral and reverse solenoids during movement between said second and third contact positions.

19. In a marine propulsion device the combination of a cylinder, a piston movable in said cylinder between first, second, and third piston positions, a sump, an oil pump communicating with said sump, a duct means communicating between said pump and said cylinder said sump and including valve means movable between a first position affording direct communication between said pump and said sump independently of said cylinder, a second position preventing direct communication between said pump and said sump and affording communication between said pump and said cylinder so as to effect displacement of said piston from said first piston position to said second piston position and so as to consequently afford communication between said cylinder and said sump, and a third position preventing communication between said duct means and said sump so as to effect displacement of said piston from said second piston position to said third piston position, and a pressure relief valve communicating with said duct means and said sump and affording communication between said duct means and said sump when said piston is in said third piston position.

20. In a marine propulsion device the combination of an actuating cylinder having a head and, a piston in said cylinder, means biasing said piston toward a first position adjacent to said cylinder head and, means limiting piston movement away from said first position to a second position spaced from said first position, a sump, an oil pump communicating with said sump, a duct system including a duct communicating between said oil pump and said cylinder head end, a conduit having a first portion communicating with said duct at a point intermediate said pump and said cylinder and having a second portion communicating with said first portion with said sump, and a fluid passageway communicating between said conduit first portion and said cylinder at a point spaced intermediate said first and second piston positions, a pressure relief valve communicating with said duct system and with said sump, a spool valve movable in said conduit between forward, neutral and reverse positions, said spool valve having means for blocking communication between said duct and said first conduit portion when said spool valve is in said neutral position and for blocking communication between said first conduit portion and said second conduit portion when said spool valve is in said reverse position, and means for shifting said spool valve between said forward, neutral, and reverse positions.

21. The combination of axially aligned first and second solenoids, an element extending through said solenoids for movement axially relative thereto and including an armature part, biasing means yieldably moving said element in one direction relative to said solenoids, means for limiting movement of said element in said one direction so as to locate said armature part in a first position with respect to said first solenoid, means for limiting travel of said element in the opposite direction to said one direction so as to locate said armature part in a second position with respect to said first solenoid in response to actuation of said first solenoid, a floating armature movable on said element axially of said solenoids, means for limiting travel of said floating armature relative to said solenoids and to said element in said opposite direction so that, in response to actuation of said second solenoid, said armature part is located in an intermediate position between said first and second positions and so that said floating armature is located in a first armature position with respect to said second solenoid, and means for limiting travel of said floating armature relative to said solenoids in said one direction so as to permit location of said floating armature in a second armature position with respect to said second solenoid response to movement of said armature part to said first position.

22. A marine propulsion unit comprising a lower unit including a rotatably mounted drive shaft having fixed thereon a first bevel gear, a propeller shaft rotatably mounted at a substantial angle to said drive shaft, spaced bevel gears rotatably mounted coaxially with said propeller shaft and in mesh with and on opposite sides of said first bevel gear, a dog mounted on said propeller shaft intermediate said spaced bevel gears for movement axially of said propeller shaft relative to a first position in operative connection with one of said spaced bevel gears and a second position spaced from and between said bevel gears, and a third position in operative connection with the other of said bevel gears, means biasing said dog to said first position, a hydraulic pressure chamber, an actuator movable axially of said propeller shaft in said chamber between first, second, and third positions and having one portion subject to the pressure in said chamber and another portion engageable with said dog to locate said dog in said first, second, and third positions when said actuator is respectively in said first second, and third positions, a sump, a pump duct means communicating with said pump and said chamber and said sump, and a valve part movable with said actuator between said pump and said sump independently of said chamber when said actuator is in said first position, a second valve position affording communication between said pump and said sump through said chamber when said actuator is moved from said first position to said second position, and a third valve position affording communication between said pump and said sump through said chamber when said actuator is moved from said first position to said third position.

23. A marine propulsion unit according to claim 22 said propeller shaft includes an axially extending bore and said biasing means is positioned within said bore.

24. A marine propulsion unit according to claim 23 wherein said other portion of said actuator is positioned in said bore.

25. A unit according to claim 22 wherein said dog is disengaged from both of said bevel gears in said second position of said actuator.

26. A marine propulsion unit according to claim 22 wherein said pump is operatively connected to one of said bevel gears.

27. A marine propulsion unit according to claim 22 wherein said chamber is located forwardly of said bevel gears.

* * * * *

UNITED STATES PATENT OFFICE
CERTIFICATE OF CORRECTION

Patent No. 3,623,583  Dated November 30, 1971

Inventor(s) William J. Shimanckas

It is certified that error appears in the above-identified patent and that said Letters Patent are hereby corrected as shown below:

Column 1, line 25    "drove" should be --- drive ---;

Column 6, line 26    "e" should be --- be ---;

Column 7, line 59    "through" should be --- independently of ---;

Column 8, line 14    after "and", insert --- a ---;

Column 8, line 57    after "cylinder", insert --- and ---;

Column 9, line 8     after "portion", insert --- and ---;

Column 9, line 44    after "solenoid", insert --- in ---;

Column 10, line 20   after "pump", insert a comma --- , ---;

Column 10, line 23   complete line missing as follows:

--- a first valve position affording direct communication between ---;

Column 10, line 31   after "22", insert --- wherein ---.

Signed and sealed this 11th day of July 1972.

(SEAL)
Attest:

EDWARD M. FLETCHER, JR.
Attesting Officer

ROBERT GOTTSCHALK
Commissioner of Patents